United States Patent
Xie

(10) Patent No.: US 11,524,900 B2
(45) Date of Patent: Dec. 13, 2022

(54) MOLECULAR SIEVE SSZ-122, ITS SYNTHESIS AND USE

(71) Applicant: CHEVRON U.S.A. INC., San Ramon, CA (US)

(72) Inventor: Dan Xie, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 44 days.

(21) Appl. No.: 17/324,206

(22) Filed: May 19, 2021

(65) Prior Publication Data

US 2022/0024775 A1  Jan. 27, 2022

Related U.S. Application Data

(60) Provisional application No. 63/054,330, filed on Jul. 21, 2020.

(51) Int. Cl.
| | | |
|---|---|---|
| C01B 39/48 | (2006.01) |
| B01J 29/70 | (2006.01) |
| B01J 20/18 | (2006.01) |
| B01J 29/06 | (2006.01) |
| B01J 29/035 | (2006.01) |
| B01J 29/00 | (2006.01) |

(52) U.S. Cl.
CPC ............ C01B 39/48 (2013.01); B01J 20/18 (2013.01); B01J 29/00 (2013.01); B01J 29/035 (2013.01); B01J 29/06 (2013.01); B01J 29/70 (2013.01); *C01P 2002/72* (2013.01); *C01P 2004/03* (2013.01)

(58) Field of Classification Search
None
See application file for complete search history.

(56) References Cited

U.S. PATENT DOCUMENTS

| | | | | |
|---|---|---|---|---|
| 6,120,581 | A * | 9/2000 | Markovs | B01D 53/047 95/120 |
| 2009/0093661 | A1 * | 4/2009 | Guillon | C07C 5/2708 502/67 |
| 2013/0046123 | A1 | 2/2013 | Corma Canos et al. | |
| 2020/0018268 | A1 | 1/2020 | Merchant et al. | |

FOREIGN PATENT DOCUMENTS

WO  2013092707 A1  6/2013

OTHER PUBLICATIONS

PCT International Search Report, International Appl. No. PCT/IB2021/054300, dated Aug. 30, 2021.
J.J. Pluth and J.V. Smith "Crystat structure of boggsite, a new high-silica zeolite with the first three-dimensional channel system bounded by both 12- and I0-rings" Am. Mineral. 1990, 75, 501-507.
E. Galli, S. Quartieri, G. Vezzalini and A. Alberti "Boggsite and tschernichite-type zeolites from Mt. Adamson, Northern Victoria Land (Antarctica)" Eur. J. Mineral. 1995, 7, 1029-1032.
S. Zanardi, G. Cruciani, A. Alberti and E. Galli "Dehydration and rehydration process in boggsite: An in situ X-ray single-crystal study" Am. Mineral. 2004, 89, 1033-1042.

* cited by examiner

*Primary Examiner* — Sheng H Davis

(57) ABSTRACT

An aluminosilicate molecular sieve material of BOG framework type, designated SSZ-122, is provided. SSZ-122 can be synthesized using 1-adamantyl-3-propylimidazolium cations as a structure directing agent. SSZ-122 may be used in organic compound conversion and/or sorptive processes.

9 Claims, 2 Drawing Sheets

MOLECULAR SIEVE SSZ-122, ITS SYNTHESIS AND USE

CROSS-REFERENCE TO RELATED APPLICATIONS

This application claims priority to and the benefit of U.S. Provisional Application Ser. No. 63/054,330, filed Jul. 21, 2020.

FIELD

This disclosure relates to a novel synthetic crystalline molecular sieve of BOG framework type, designated SSZ-122, its synthesis, and its use in organic compound conversion and sorption processes.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a unique structure has been established, are assigned a three-letter code and are described, for example, in the "Atlas of Zeolite Framework Types" by Ch. Baerlocher, L. B. McCusker and D. H. Olson (Elsevier, Sixth Revised Edition, 2007).

Natural mineral boggsite is a molecular sieve material having a unique three-dimensional channel system of 10- and 12-rings. The framework structure of boggsite has been assigned the three-letter code BOG by the Structure Commission of the International Zeolite Association.

According to the present disclosure, an aluminosilicate molecular sieve of BOG framework type, designated SSZ-122, has now been synthesized using 1-adamantyl-3-propylimidazolium cations as a structure directing agent.

SUMMARY

In a first aspect, there is provided an aluminosilicate molecular sieve of BOG framework type, wherein the aluminosilicate molecular sieve has a molar ratio of $SiO_2/Al_2O_3$ of at least 10.

In a second aspect, there is provided an aluminosilicate molecular sieve of BOG framework type and, in its as-synthesized form, comprising 1-adamantyl-3-propylimidazolium cations in its pores.

In a third aspect, there is provided a method of synthesizing an aluminosilicate molecular sieve of BOG framework type, the method comprising (1) preparing a reaction mixture comprising: (a) a FAU framework type zeolite; (b) a source of an alkali or alkaline earth metal (M); (c) a structure directing agent comprising 1-adamantyl-3-propylimidazolium cations (Q); (d) a source of hydroxide ions; and (e) water; and (2) subjecting the reaction mixture to crystallization conditions sufficient to form crystals of the aluminosilicate molecular sieve.

In a fourth aspect, there is provided a process of converting a feedstock comprising an organic compound to a conversion product which comprises contacting the feedstock at organic compound conversion conditions with a catalyst comprising an aluminosilicate molecular sieve of BOG framework type, wherein the aluminosilicate molecular sieve has a molar ratio of $SiO_2/Al_2O_3$ of at least 10.

DETAILED DESCRIPTION

Definitions

Figure 1:
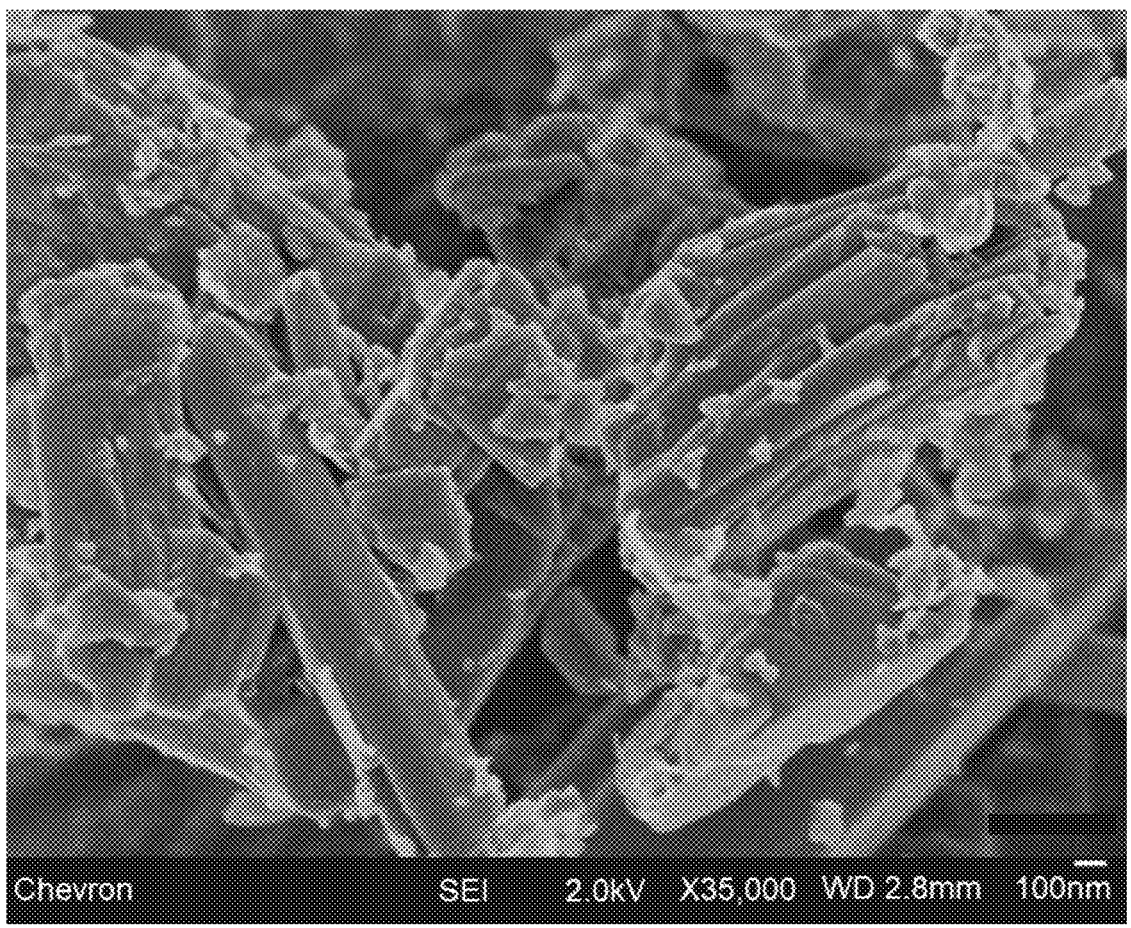
FIG. 1 is a Scanning Electron Micrograph (SEM) image of the as-synthesized SSZ-122 of Example 1.

The term "zeolite" refers herein to a molecular sieve having a framework constructed of TO4 tetrahedra and the T-atoms are silicon and aluminum atoms.

The term "framework type" has the meaning described in the "Atlas of Zeolite Framework Types" by Ch. Baerlocher, L. B. McCusker and D. H. Olson (Elsevier, Sixth Revised Edition, 2007).

The term "as-synthesized" refers to a molecular sieve in its form after crystallization, prior to removal of the structure directing agent.

The term "anhydrous" refers to a molecular sieve substantially devoid of both physically adsorbed and chemically adsorbed water.

The term "$SiO_2/Al_2O_3$ molar ratio" may be abbreviated as "SAR".

Synthesis of the Molecular Sieve

Molecular sieve SSZ-122 can be synthesized by: (1) preparing a reaction mixture comprising (a) a FAU framework type zeolite; (b) a source of an alkali or alkaline earth metal (M); (c) a structure directing agent comprising 1-adamantyl-3-propylimidazolium cations (Q); (d) a source of hydroxide ions; and (e) water; and (2) subjecting the reaction mixture to crystallization conditions sufficient to form crystals of the aluminosilicate molecular sieve.

The reaction mixture can have a composition, in terms of molar ratios, within the ranges set forth in Table 1:

TABLE 1

| Reactants | Broadest | Typical |
|---|---|---|
| $SiO_2/Al_2O_3$ | ≥10 | 20 to 60 |
| $M/SiO_2$ | 0.05 to 0.50 | 0.10 to 0.40 |
| $Q/SiO_2$ | 0.01 to 0.30 | 0.05 to 0.20 |
| $OH/SiO_2$ | 0.20 to 0.60 | 0.30 to 0.50 |
| $H_2O/SiO_2$ | 15 to 60 | 20 to 40 | wherein M is an alkali or alkaline earth metal and Q comprises 1-adamantyl-3-propylimidazolium cations.

The FAU framework type zeolite can be ammonium-form zeolites or hydrogen-form zeolites (e.g., $NH_4$-form zeolite Y, H-form zeolite Y). Examples of the FAU framework type zeolite include zeolite Y (e.g., CBV712, CBV720, CBV760, CBV780, HSZ-HUA385, and HSZ-HUA390). Preferably, the FAU framework type zeolite is zeolite Y. Zeolite Y can have an $SiO_2/Al_2O_3$ molar ratio of about 12 to about 500. The FAU framework type zeolite can comprise two or more zeolites. Typically, the two or more zeolites are zeolites Y having different silica-to-alumina molar ratios. The FAU framework type zeolite can also be the only silicon and aluminum source to form SSZ-122.

The alkali or alkaline earth metal (M) is typically introduced into the reaction mixture in conjunction with the source of hydroxide ions. Examples of such metals include sodium and/or potassium, and also lithium, rubidium, cesium, magnesium, and calcium. As used herein, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals.

The structure directing agent used in preparing SSZ-122 comprises 1-adamantyl-3-propylimidazolium cations (Q), represented by the following structure (1):

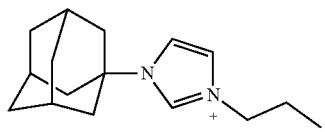

(1)

Suitable sources of Q are the hydroxides, chlorides, bromides, and/or other salts of the quaternary ammonium compound.

The reaction mixture may contain seeds of a crystalline material, such as SSZ-122 from a previous synthesis, desirably in an amount of from 0.01 to 10,000 ppm (e.g., 100 to 5000 ppm) by weight of the reaction mixture. Seeding can be advantageous to improve selectivity for SSZ-122 and/or to shorten the crystallization process.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless-steel autoclaves, at a temperature of from 120° C. to 200° C. (e.g., 140° C. to 180° C.) for a time sufficient for crystallization to occur at the temperature used (e.g., from 1 day to 21 days, or from 3 days to 16 days). Crystallization is usually conducted in an autoclave so that the reaction mixture is subject to autogenous pressure.

Once the desired molecular sieve crystals have formed, the solid product is separated from the reaction mixture by standard separation techniques such as filtration or centrifugation. The recovered crystals are water-washed and then dried, for several seconds to a few minutes (e.g., from 5 seconds to 10 minutes for flash drying) or several hours (e.g., from 4 to 24 hours for oven drying at 75° C. to 150° C.), to obtain as-synthesized SSZ-122 crystals having at least a portion of the organic cation within its pores. The drying step can be performed at atmospheric pressure or under vacuum.

The as-synthesized molecular sieve may be subjected to thermal treatment, ozone treatment, or other treatment to remove part or all of the structure directing agent used in its synthesis. Removal of the structure directing agent may be carried out by thermal treatment (i.e., calcination) in which the as-synthesized molecular sieve is heated in air or inert gas at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in air for approximately 1 to 8 hours.

Any extra-framework metal cations in the molecular sieve can be replaced in accordance with techniques well known in the art (e.g., by ion exchange) with hydrogen, ammonium, or any desired metal cation.

Characterization of the Molecular Sieve

In its as-synthesized and anhydrous form, molecular sieve SSZ-122 can have a chemical composition, in terms of molar ratios, within the ranges set forth in Table 2:

TABLE 2

| | Broadest | Typical |
|---|---|---|
| $SiO_2/Al_2O_3$ | ≥10 | 20 to 60 |
| $Q/SiO_2$ | >0 to 0.1 | >0 to 0.1 |
| $M/SiO_2$ | >0 to 0.1 | >0 to 0.1 | wherein Q comprises 1-adamantyl-3-propylimidazolium cations and M is an alkali or alkaline earth metal.

In its calcined form, molecular sieve SSZ-122 can have a chemical composition comprising the following molar relationship:

$Al_2O_3$:$(n)SiO_2$ wherein n is at least 10 (e.g., 10 to 100, 10 to 60, 20 to 100, or 20 to 60).

The framework structure of SSZ-122 can be free or substantially free of T-atoms (tetrahedral atoms) other than silicon and aluminum. As used herein, the term "substantially free of" means that the molecular sieve contains less than 0.1% or 0.01% of the named framework impurity.

Powder XRD patterns representative of BOG framework type molecular sieves can be referenced in the "*Collection of Simulated XRD Powder Patterns for Zeolites*" by M. M. J. Treacy and J. B. Higgins (Elsevier, Fifth Revised Edition, 2007).

The powder XRD patterns presented herein were collected by standard techniques. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

INDUSTRIAL APPLICABILITY

Molecular sieve SSZ-122 (where part or all of the structure directing agent is removed) may be used as a sorbent or as a catalyst to catalyze a wide variety of organic compound conversion processes including many of present commercial/industrial importance. Examples of chemical conversion processes which are effectively catalyzed by SSZ-122, by itself or in combination with one or more catalytically active substances including other crystalline catalysts, include those requiring a catalyst with acid activity. Examples of organic conversion processes which may be catalyzed by SSZ-122 may include cracking, hydrocracking, disproportionation, alkylation, oligomerization, and isomerization.

As in the case of many catalysts, it may be desirable to incorporate SSZ-122 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-122 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-122 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-122 also include inorganic oxides, such as silica, zirconia, titania, magnesia, beryllia, alumina, and mixtures thereof.

In addition to the foregoing materials, SSZ-122 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-122 and inorganic oxide matrix may vary widely, with the SSZ-122 content ranging from 1 to 90 wt. % (e.g., 2 to 80 wt. %) of the composite.

EXAMPLES

The following illustrative examples are intended to be non-limiting.

Example 1

2.18 g of deionized water, 0.20 g of a 45% KOH solution, 1.55 g of a 13.62% 1-adamantyl-3-propylimidazolium hydroxide solution and 0.50 g of Zeolyst CBV720 Y-zeolite powder (SAR=30) were mixed together in a Teflon liner. The resulting gel was stirred until it became homogeneous. The liner was then capped and placed within a Parr Steel autoclave reactor. The autoclave was then put in an oven heated at 150° C. for 10 days with tumbling at 43 rpm. The solid products were recovered from the cooled reactor by centrifugation, washed with deionized water and dried at 95° C.

Figure 2:
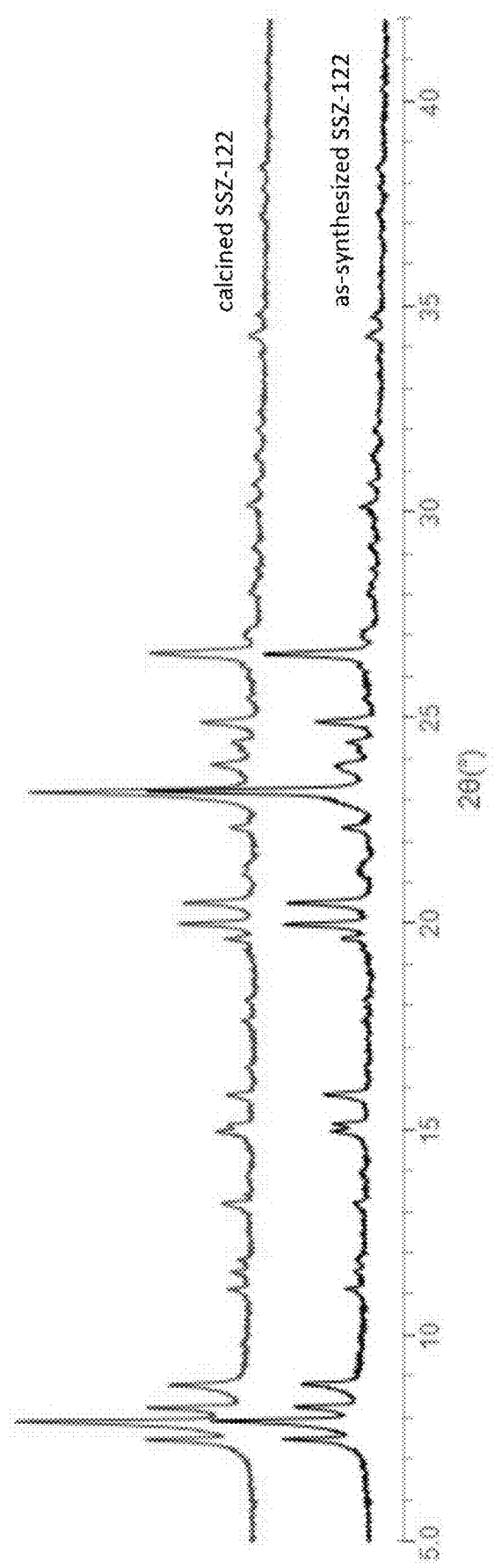
FIG. 2 compares the powder X-ray diffraction (XRD) patterns of as-synthesized SSZ-122 of Example 1 (bottom pattern) and calcined SSZ-122 of Example 6 (top pattern).

The resulting product was analyzed by SEM and powder XRD. A SEM image is shown in FIG. 1 and indicates a uniform field of crystals. The powder XRD pattern of the as-synthesized material is shown in FIG. 2 and is consistent with the material having the BOG framework type structure.

The product had a $SiO_2/Al_2O_3$ molar ratio of 24.2, as determined by Inductively Coupled Plasma—Atomic Emission Spectroscopy (ICP-AES) elemental analysis.

Example 2

4.35 g of deionized water, 0.40 g of a 45% KOH solution, 3.01 g of a 13.62% 1-adamantyl-3-propylimidazolium hydroxide solution and 1.00 g of Zeolyst CBV720 Y-zeolite powder (SAR=30) were mixed together in a Teflon liner. The gel was stirred until it became homogeneous. The liner was then capped and placed within a Parr Steel autoclave reactor. The autoclave was then put in an oven heated at 160° C. for 14 days under static conditions. The solid products were recovered from the cooled reactor by centrifugation, washed with deionized water and dried at 95° C.

The resulting product was identified by SEM and powder XRD as a pure aluminosilicate molecular sieve having the BOG framework type structure.

The product had a $SiO_2/Al_2O_3$ molar ratio of 25.5, as determined by ICP-AES elemental analysis.

Example 3

1.31 g of deionized water, 0.12 g of a 50% NaOH solution, 0.93 g of a 13.62% 1-adamantyl-3-propylimidazolium hydroxide solution and 0.30 g of Zeolyst CBV760 Y-zeolite powder (SAR=60) were mixed together in a Teflon liner. The resulting gel was stirred until it became homogeneous. The liner was then capped and placed within a Parr Steel autoclave reactor. The autoclave was then put in an oven heated at 150° C. for 10 days under static conditions. The solid products were recovered from the cooled reactor by centrifugation, washed with deionized water and dried at 95° C.

The resulting product was identified by powder XRD and SEM as a pure aluminosilicate molecular sieve having the BOG framework type structure.

The product has a SAR of 48.8, as determined by ICP-AES elemental analysis.

Example 4

0.50 g of deionized water, 0.12 g of a 45% KOH solution, 1.86 g of 13.62% 1-adamantyl-3-propylimidazolium hydroxide solution and 0.30 g of Zeolyst CBV720 Y-zeolite powder (SAR=30) were mixed together in a Teflon liner. The gel was stirred until it became homogeneous. The liner was then capped and placed within a Parr Steel autoclave reactor. The autoclave was then put in an oven heated at 150° C. for 16 days under static conditions. The solid products were recovered from the cooled reactor by centrifugation, washed with deionized water and dried at 95° C.

The resulting product was identified by powder XRD and SEM as a pure aluminosilicate molecular sieve having the BOG framework type structure.

The product had a $SiO_2/Al_2O_3$ molar ratio of 24.7, as determined by ICP-AES elemental analysis.

Example 5

1.51 g of deionized water, 0.20 g of a 45% KOH solution, 2.33 g of 13.62% 1-adamantyl-3-propylimidazolium hydroxide solution, 0.50 g of Zeolyst CBV712 Y-zeolite powder (SAR=12), and 0.08 g of as-synthesized SSZ-122 seed crystals from Example 1 were mixed together in a Teflon liner. The gel was stirred until it became homogeneous. The liner was then capped and placed within a Parr Steel autoclave reactor. The autoclave was then put in an oven heated at 150° C. for 7 days with tumbling at 43 rpm. The solid products were recovered from the cooled reactor by centrifugation, washed with deionized water and dried at 95° C.

The resulting product was identified by powder XRD and SEM as a pure aluminosilicate molecular sieve having the BOG framework type structure.

The product had a $SiO_2/Al_2O_3$ molar ratio of 12.7, as determined by ICP-AES elemental analysis.

Example 6

The as-synthesized molecular sieve product from Example 1 was calcined inside a muffle furnace under a flow of air heated to 540° C. at a rate of 1° C./minute and held at 540° C. for 5 hours, cooled and then analyzed by powder XRD. The powder XRD of the calcined material is shown in FIG. 2 and indicates that the material remains stable after calcination to remove the structure directing agent.

Example 7

The calcined material from Example 5 was treated with 10 mL (per g of molecular sieve) of a 1 N ammonium nitrate solution at 95° C. for 2 hours. The solution was cooled, decanted off and the same process repeated. After drying, the ammonium form product was subjected to a micropore volume analysis using N2 as adsorbate and via the BET method. The molecular sieve exhibited a micropore volume of 0.21 cm$^3$/g.

The invention claimed is:

1. An aluminosilicate molecular sieve of a BOG framework and, in its as-synthesized form, comprising 1-adamantyl-3-propylimidazolium cations in its pores.

2. The aluminosilicate molecular sieve of claim 1, having a molar ratio of $SiO_2/Al_2O_3$ of at least 10.

3. The aluminosilicate molecular sieve of claim 1, having a molar ratio of $SiO_2/Al_2O_3$ in a range of 20 to 60.

4. A method of synthesizing an aluminosilicate molecular sieve of a BOG framework, the method comprising:
   (1) preparing a reaction mixture comprising:
      (a) a zeolite of a FAU framework;
      (b) a source of an alkali or alkaline earth metal (M);
      (c) a structure directing agent comprising 1-adamantyl-3-propylimidazolium cations (Q);
      (d) a source of hydroxide ions; and
      (e) water; and
   (2) subjecting the reaction mixture to crystallization conditions sufficient to form crystals of the aluminosilicate molecular sieve.

5. The method of claim 4, wherein the reaction mixture has a composition, in terms of molar ratios, as follows:

| | |
|---|---|
| $SiO_2/Al_2O_3$ | ≥10 |
| $M/SiO_2$ | 0.05 to 0.50 |
| $Q/SiO_2$ | 0.01 to 0.30 |
| $OH/SiO_2$ | 0.20 to 0.60 |
| $H_2O/SiO_2$ | 15 to 60. |

6. The method of claim 4, wherein the reaction mixture has a composition, in terms of molar ratios, as follows:

| | |
|---|---|
| $SiO_2/Al_2O_3$ | 20 to 60 |
| $M/SiO_2$ | 0.10 to 0.40 |
| $Q/SiO_2$ | 0.05 to 0.20 |
| $OH/SiO_2$ | 0.30 to 0.50 |
| $H_2O/SiO_2$ | 20 to 40. |

7. The method of claim 4, wherein the zeolite of a FAU framework is zeolite Y.

8. The method of claim 4, wherein the alkali of alkaline earth metal comprises sodium, potassium, or a combination thereof.

9. The method of claim 4, wherein the crystallization conditions include heating the reaction mixture under autogenous pressure at a temperature of from 120° C. to 200° C. and for a time of from 1 day to 21 days.

* * * * *